United States Patent
Thompson

(10) Patent No.: US 7,117,178 B2
(45) Date of Patent: Oct. 3, 2006

(54) SYSTEMS AND METHODS TO FACILITATE PAYMENT FOR SHIPPED GOODS

(75) Inventor: Mark Thompson, Denver, CO (US)

(73) Assignee: First Data Corporation, Englewood, CO (US)

( * ) Notice: Subject to any disclaimer, the term of this patent is extended or adjusted under 35 U.S.C. 154(b) by 298 days.

(21) Appl. No.: 09/965,667

(22) Filed: Sep. 26, 2001

(65) Prior Publication Data

US 2003/0061146 A1    Mar. 27, 2003

(51) Int. Cl.
G06Q 40/00 (2006.01)

(52) U.S. Cl. .............................. 705/40; 705/26; 705/37

(58) Field of Classification Search ................... 705/40, 705/26, 37
See application file for complete search history.

(56) References Cited

U.S. PATENT DOCUMENTS

| 4,799,156 | A | * | 1/1989 | Shavit et al. ................ 705/26 |
| 5,732,400 | A |   | 3/1998 | Mandler et al. |
| 5,910,896 | A |   | 6/1999 | Hahn-Carlson |
| 5,987,429 | A |   | 11/1999 | Maritzen et al. |
| 2001/0032878 | A1 | * | 10/2001 | Tsiounis et al. ............ 235/379 |
| 2001/0037247 | A1 | * | 11/2001 | Haseltine ..................... 705/22 |
| 2001/0037290 | A1 | * | 11/2001 | Lai ............................. 705/39 |
| 2002/0069166 | A1 | * | 6/2002 | Moreau et al. ............... 705/40 |
| 2002/0087461 | A1 | * | 7/2002 | Ganesan et al. .............. 705/39 |
| 2002/0116241 | A1 | * | 8/2002 | Sandhu et al. ................. 705/7 |

FOREIGN PATENT DOCUMENTS

| EP | 1006469 A1 | * | 6/2000 |
| WO | WO 01/41419 A1 |   | 6/2001 |

* cited by examiner

Primary Examiner—Jagdish N Patel
(74) Attorney, Agent, or Firm—Townsend and Townsend and Crew LLP

(57) ABSTRACT

Systems and methods are provided for managing a transaction for a sale of goods between a customer and a merchant. A communication relating to the transaction is received by a provider that is affiliated with several offices, the communication including at least an indication of the cost for the goods. The cost is collected from the customer in accordance with the communication. The cost is paid to the merchant after the merchant delivers the goods.

16 Claims, 5 Drawing Sheets

SYSTEMS AND METHODS TO FACILITATE PAYMENT FOR SHIPPED GOODS

BACKGROUND OF THE INVENTION

This invention relates generally to retail sales. More particularly, the invention relates to systems and methods to facilitate payment for shipped goods.

In recent years, the internet has provided a new venue for a variety of commercial transactions that is, in many respects, more convenient for consumers than traditional venues. It is widely expected that the availability of the internet for commercial transactions will ultimately prove revolutionary. Already, a large number of companies that sell goods in traditional ways, through retail outlet shops and through catalogues, have also made their products available for sale over the internet. In addition, a significant number of companies have developed systems for selling goods exclusively over the internet, generally expecting that such a paradigm will prove more profitable than traditional retail sales because of reduced overhead costs and the capacity for automation.

Currently, retail transactions for goods executed over the internet proceed in essentially the same fashion regardless of whether the seller also supports traditional sales venues. A customer who visits the seller's worldwide web site makes a selection after viewing some description of available goods, provides shipping information, and authorizes the charges to be made against a valid credit card. The seller charges the credit-card issuer and ships the goods to the customer. There may be variations on such a process, including providing insurance for the goods, gift wrapping the goods, shipping them to third parties, etc., but the basic transaction relies on having the customer provide a valid credit account number to the seller.

One weakness in such a process is the need for the customer to provide the valid credit account number. Many customers are reluctant to provide such information because of the perceived danger that the information may be used fraudulently; this concern is generally greater to such customers for internet transactions since they believe the risk of interception of the information may be greater than in other venues. Some efforts have been made to provide alternatives for such customers, but those alternatives tend either to be inconvenient or not to be readily acceptable to sellers. A similar barrier inhibiting transactions is sometimes reflected by reluctance on the part of sellers when the transactions are international. This reluctance arises from the less well developed integration of foreign credit systems so that sellers face increased uncertainty that they will recover funds when the shipments are made internationally.

In addition to these situations, there are many business that simply do not accept credit cards at all. Sometimes such policies are adopted because of costs charged by credit-card suppliers to the businesses. Regardless of the motivation for refusing to accept credit cards, there is no simple way for remote transactions to be completed with such business even if the goods are not offered over the internet.

There is accordingly a need in the art for methods and systems that facilitate payment for shipped goods by providing increased security both to the customer and to the seller.

BRIEF SUMMARY OF THE INVENTION

Embodiments of the invention thus provide methods and systems for allowing a provider to manage a transaction for a sale of goods between a customer and a merchant. Such embodiments do not require the exchange of credit-account information between the customer and merchant, even where the customer and merchant are physically very separate. Accordingly, such embodiments remove the barrier to such transactions presented by the need to exchange credit-account information, regardless of whether that barrier results from concerns of the customer or the merchant.

Embodiments of the invention make use of a third-party service provider, which in certain embodiments is an entity affiliated with a plurality of offices so that visits to one of the provider's offices by customers in many geographical locations are convenient. Once the customer and merchant agree to a sale of goods, such as by the customer placing an order for the goods at the merchant's web site, the provider receives a communication providing certain details of the transaction, such as a description of the goods, the identities of the customer and merchant, when and where the goods are to be delivered, and any guarantees that may be provided regarding the condition of the goods. The communication also includes the cost to be paid for the goods. Generally the place of delivery will be one of the provider's offices. Instead of paying the merchant, the customer pays for the cost of the goods and usually also a service charge for the participation of the provider to the provider. Such payment may be made by any method convenient to both the customer and the provider, including payment with a credit account when there is no barrier to such an exchange between the provider and the customer. The provider pays the cost of the goods to the merchant after the merchant has delivered the goods.

The customer may pay the full of the amount of the goods plus any service charge at once or may pay a portion, for example 25% down, with the remainder to be paid upon delivery. In cases where the customer pays in full before delivery, the goods may be delivered directly to the customer by the merchant, with the provider being notified of successful delivery. Alternatively, the goods may be delivered to the provider, who makes them available for collection by the customer at one of the provider's offices. In either instance, the provider pays the cost to the merchant once the requisite delivery is completed. If instead the customer pays only a portion of the cost plus any service charge, the goods will usually be delivered to the provider, where they will be made available for collection by the customer upon payment of the remainder due.

The methods of the present invention may be embodied in a computer-readable storage medium having a computer-readable program embodied therein for directing operation of a computer system. Such a computer system may include a communications system, a processor, and a storage device. The computer-readable program includes instructions for operating the computer system to manage a transaction for the sale of goods between a customer and a merchant in accordance with the embodiments described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Embodiments of the invention provide a method and system for managing a transaction for a sale of goods between and customer and a merchant. A portion of the transaction is managed by a provider who provides security to both the merchant and the customer. In the following description, embodiments are described in which communications among the customer, merchant, and provider are effected through the internet, and in which alternative methods of communication are used. For example, orders for goods, communications to the provider, and any other exchanges of information may alternatively be placed by telephone, fax, or any other suitable method without exceeding the scope of the invention.

Figure 1A:
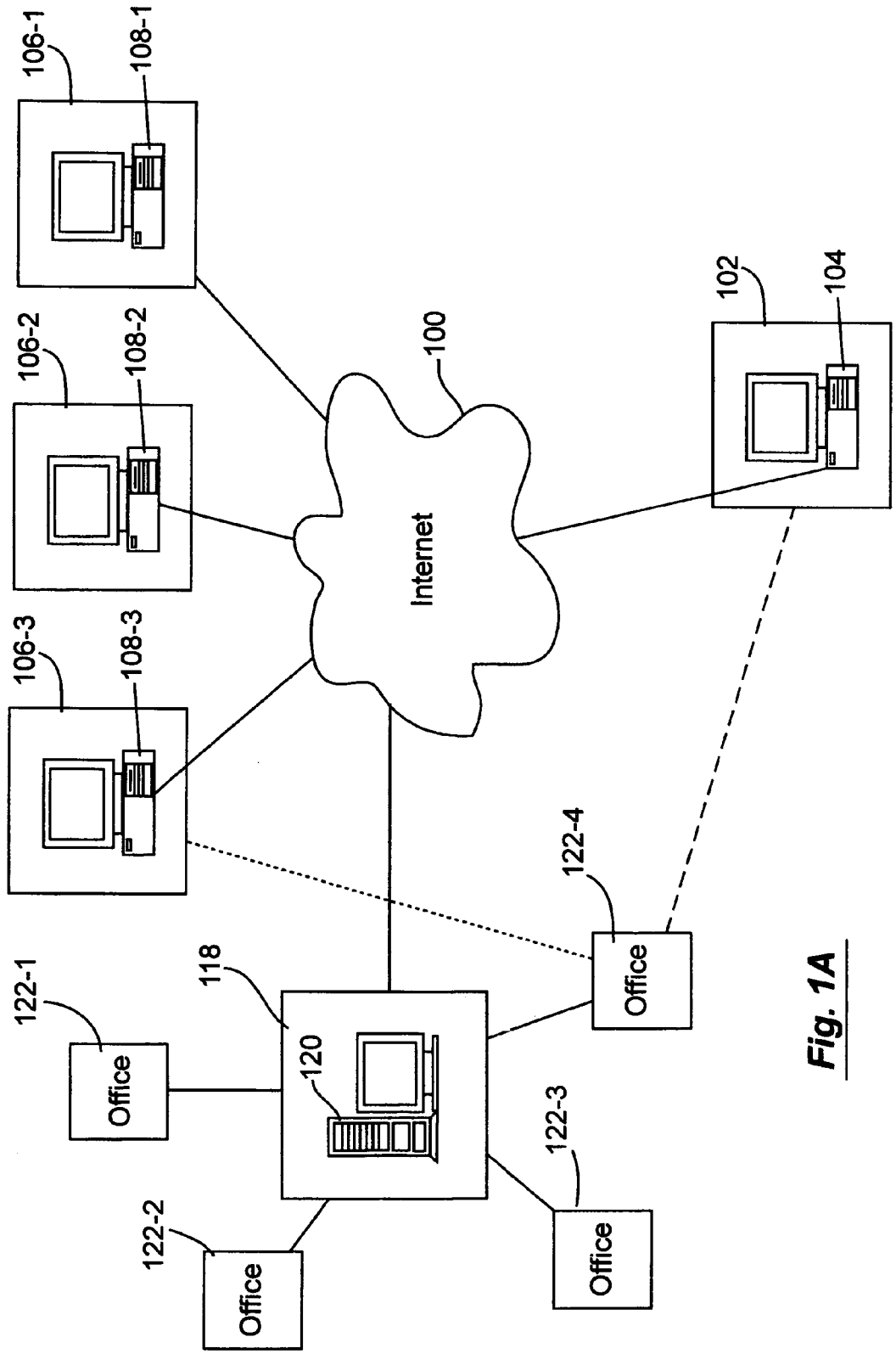
FIGS. 1A, 1B, and 1C provide schematic illustrations of the interconnection of a various entities in different embodiments of the invention.
Figure 1B:
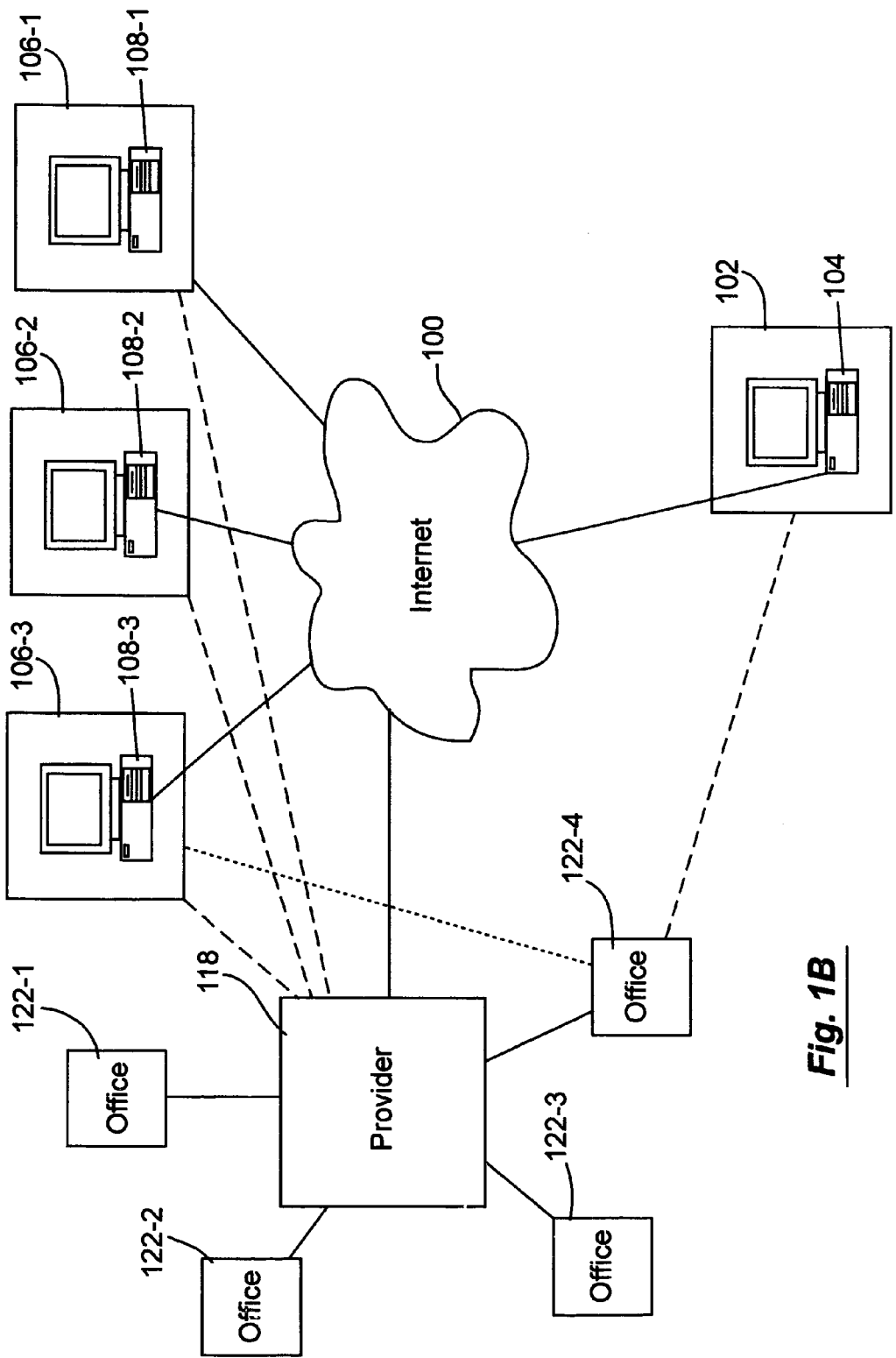
Figure 1C:
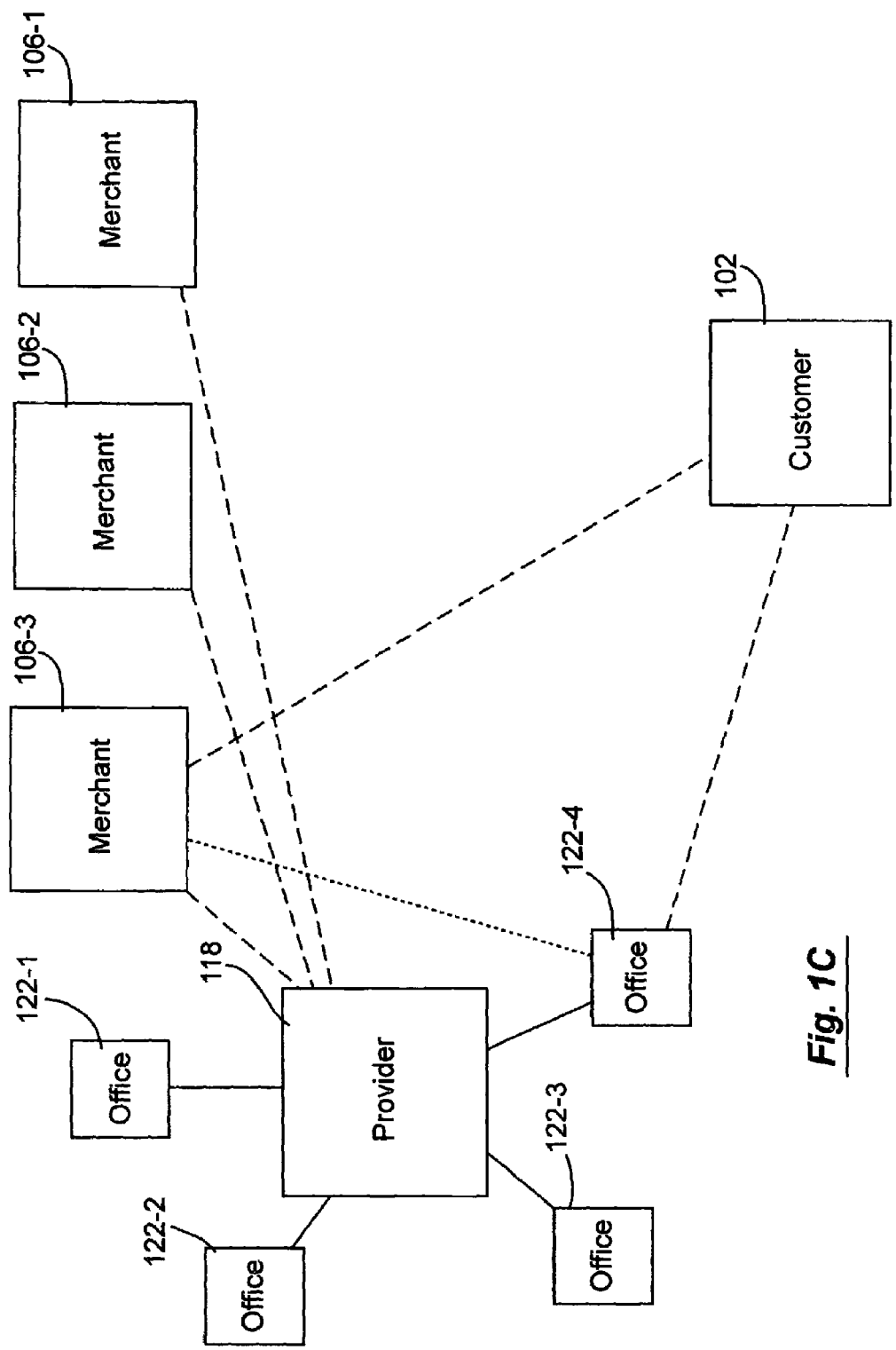

FIGS. 1A, 1B, and 1C provide schematic diagrams illustrating communication among a customer 102, the provider 118, and a plurality of merchants 106 for different embodiments of the invention. The provider 118 may comprise a central organization and a plurality of offices 122 structure to perform the functions described below. As used herein, "office" is intended to be interpreted broadly and refers to any place affiliated with the provider and capable of interacting with customers 102 and merchants to perform the functions described. In some instances, for example, an office 122 may be a physical place of business of the provider that performs only business functions of the provider 118. In other instances, the principal business of the office 122 may be unrelated to functions described herein, although it engages in those functions as a secondary, tertiary, or even less important aspect of its operation. Accordingly, the affiliation between the provider 118 and a given office 122 may take the form of a contractual, agency, joint venture, or other similar relationship, in addition to being a subsidiary or business place of the provider 122. The effectiveness of the systems and methods of the invention will generally be increased where the number of offices 122 is sufficiently large and geographically dispersed so that at least one office 122 is conveniently proximate to a particular customer 102 who wishes to use the system.

In the first embodiment, illustrated with FIG. 1A, communication among the customer 102, provider 118, and merchants 106 is effected through the internet 100, which is connected respectively with a customer computer 104, a provider computer 120, and a plurality of merchant computers 108. The provider 118 itself is configured for communication with the plurality of offices 122 through any suitable communication means. Supposing that the customer 102 wishes to execute a transaction for a sale of goods with a particular merchant, say merchant 106-3, he connects his computer 104 to the internet 100 and thereby establishes a connection with the desired merchant computer 108-3. Typically, the order for the goods will comprise a transaction without an exchange of credit-account information from the customer 102, perhaps because the customer 102 and desired merchant 106-3 are physically located in separate countries; or, the customer 102 simply prefers that his credit-account information not be disclosed as part of the transaction.

Once the order for the goods is established through the connection between the customer 102 and the desired merchant 106-3, a communication is received by the provider computer 120 over the internet 100 that includes at least some details of the transaction, such as the cost of the goods. Various ways in which the transaction may be completed in accordance with embodiments of the invention are described below with respect to FIG. 3. In at least some of those embodiments, the customer 102 will collect goods from one of the provider's offices, say office 122-4. That particular office 122-4 will generally be conveniently proximate to the physical location of the customer 102 so that interactions between the customer 102 and the particular office 122-4 will be by traditional means, such as direct contact, indicated by the dashed line. In some instances, there may also be communications directly between the desired merchant 106-3 and the particular office 122-4; such communications may proceed by such traditional means as telephone, fax, mail, etc., and are indicated by the dotted line.

In the second embodiment, illustrated with FIG. 1B, only the customer 102 and the merchants 106 establish communications with the internet 100. The basic structure of the illustrated system is similar to that shown in FIG. 1A except that communications between the provider 118 and the merchants 106 are carried out through non-internet-based means, such as telephone, fax, mail, etc. Such communications links are indicated with dashed lines between the provider 118 and the merchants 106. Thus, in the second embodiment, a customer 102 may wish to execute a transaction for a sale of goods with a particular merchant, say merchant 106-3. He therefore uses an internet connection with the desired merchant computer 108-3 to place an order for the goods, relevant details of which are communicated to the provider 118. Aspects of the transaction may thus involve a particular office, say office 122-4, which may engage in traditional communications with the merchant 106-3 shown by the dotted line and with the customer 102 shown by a dashed line.

In the third embodiment, illustrated with FIG. 1C, no communications take place with the internet. Such an embodiment is particularly suitable for merchants who do not accept credit-card transactions and do not sell goods over the internet, but nevertheless wish to participate in selling to remote customers. The basic structure of the illustrated system is similar to that shown in FIGS. 1A and 1B except that all communications take place through non-internet-based means, such as telephone, fax, mail, etc. Such communications are denoted generally with dashed lines between the provider 118 and the merchants 106, as well as between the customer 102 and the particular merchant, say merchant 106-3, with whom he wishes to place an order for goods. After an order is placed by a non-internet-based means, relevant details of the order are communicated to the provider 118. Aspects of the transaction may involve a particular office, say office 122-4, which may engage in traditional communications with the merchant 106-3 shown by the dotted line and with the customer 102 shown by a dashed line.

Figure 2:
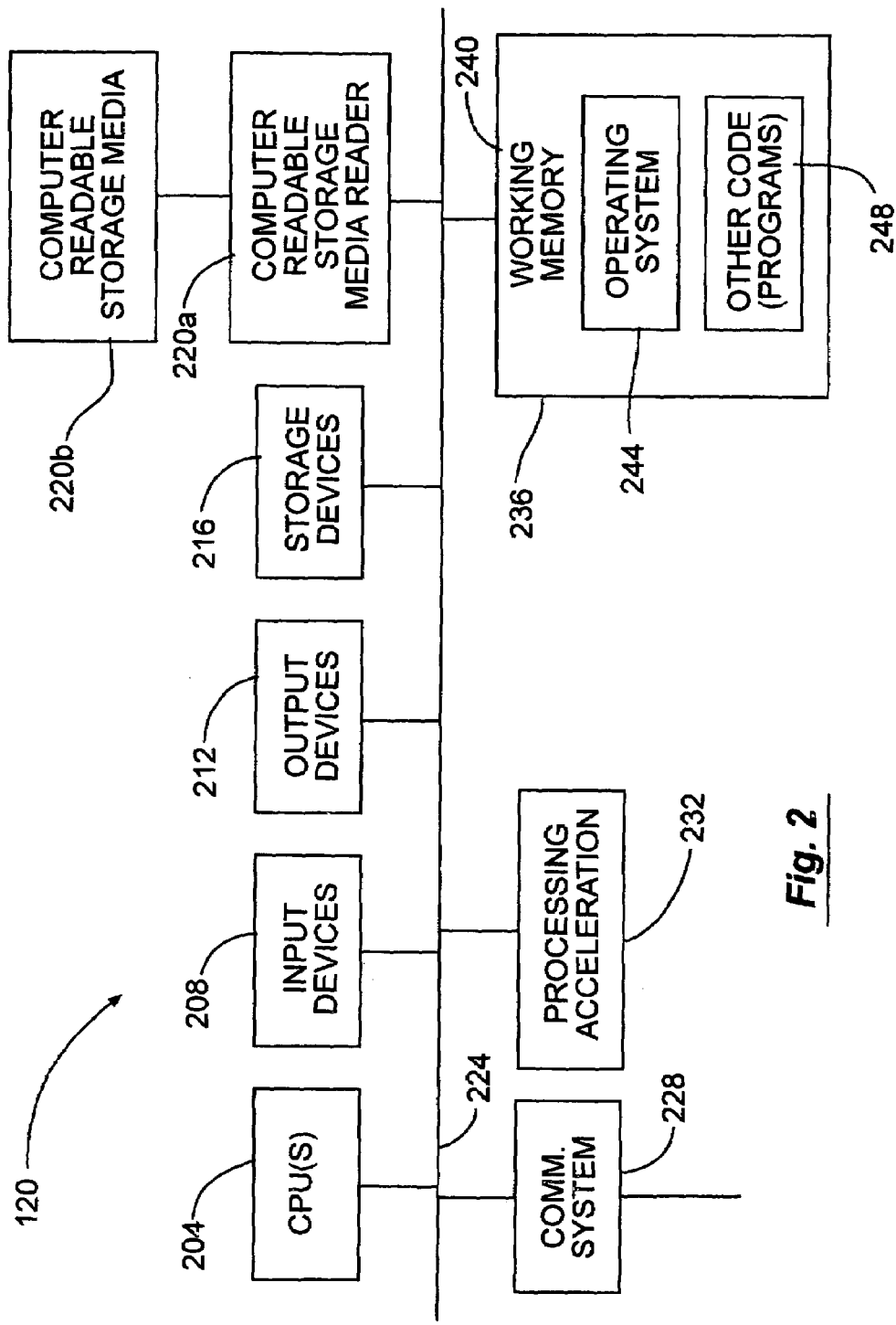
FIG. 2 provides a schematic illustration of a configuration of a computer system on which methods of the invention may be embodied.

An example of a configuration that may be used for the provider computer 120 is shown in FIG. 2 for those embodiments where the provider 118 receives transaction details electronically. Such embodiments will typically be of the general form shown in FIG. 1A, with communications being provided over the internet 100, although transaction details may be provided to a provider computer 120 in different ways in other embodiments also. FIG. 2 broadly illustrates how individual system elements may be implemented in a separated or more integrated manner. The provider computer 120 is shown comprised of hardware elements that are electrically coupled via bus 224, including a processor 204, an input device 208, an output 212, a storage device 216, a computer-readable storage media reader 220a, a communications system 228, a processing acceleration unit 232 such as a DSP or special-purpose processor, and a memory 236. The computer-readable storage media reader 220a is further connected to a computer-readable storage medium 220b, the combination comprehensively representing remote, local, fixed, and/or removable storage devices plus storage media for temporarily and/or more permanently containing computer-readable information. For the illustrated embodiment, the communications system 228 provides a connection with the internet and may comprise a wired, wireless, modem, and/or other type of interfacing connection.

The provider computer 120 also comprises software elements, shown as being currently located within working memory 240, including an operating system 244 and other code 248, such as a program designed to implement the methods and systems of the invention. It will be apparent to those skilled in the art that substantial variations may be used in accordance with specific requirements. For example, customized hardware might also be used and/or particular elements might be implemented in hardware, software (including portable software, such as applets), or both. Further, connection to other computing devices such as network input/output devices may be employed.

The customer computer 104 and the merchant computers 108 may be configured with a similar structure as the provider computer 120, although the programming for managing the aspects of the transaction described below will generally be resident on the provider computer. The customer computer 104 and the merchant computers 108 will each generally include programming that permits internet connections so that an order for goods may be placed. In addition, the merchant computers 108 will generally include programming for the automatic transfer of information between the provider computer 120 and each merchant computer 108. Such information may be transferred in accordance with the description below to permit the status of orders, deliveries, and payments to be monitored by the provider 118 and/or each merchant 106.

Figure 3:
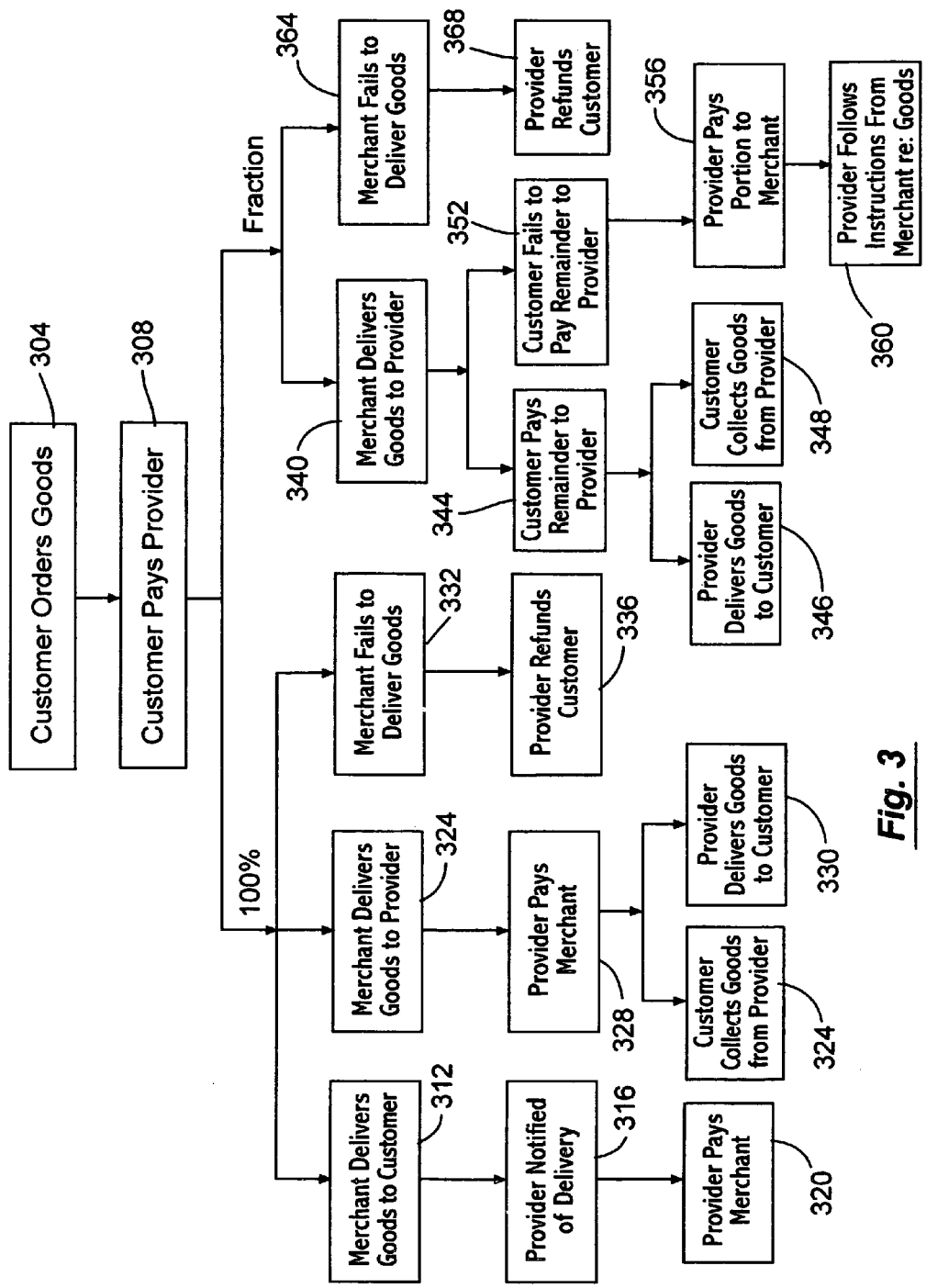
FIG. 3 provides a flow diagram illustrating a variety of methods as embodied by the invention.

The flow diagram of FIG. 3 illustrates a number of embodiments. At block 304, the customer 102 orders the goods, such as through the internet as described with respect to FIGS. 1A or 1B, or through another communication method such as described with respect to FIG. 1C. For the embodiments of FIG. 1A that includes internet connections among the customer 102, merchants 106, and provider 118, goods will usually be ordered directly from the merchant's 106 web site. In some embodiments, however, the goods may alternatively be ordered by connecting to the provider's 118 web site. In such an embodiment, the provider's 118 web site may offer the ability to order from multiple merchants 106 by using the internet 100 connection to merchant computers 108-1, 108-2, 108-3, . . . . It is also possible in other embodiments for the order to be made through another third party, provided that at block 304 an order is placed by the customer 102 for goods sold by the merchant 106.

At block 308, the customer 102 pays the provider 118. Such payment may be made by any suitable means, including payment by cash, check, money order, credit card, etc.

While one aspect of the invention addresses the desire to avoid providing credit-account information to the merchant 106, motivated either by considerations of the customer 102 or considerations of the merchant 106, there may still be instances where providing that information to the provider 118 is acceptable. For example, where the transaction is international, but the provider 118 is located in the same country as the customer 102, there may be no barrier to accepting a credit account for payment. Also, since many of the embodiments contemplate that the provider 118 has multiple offices, at least one of which is conveniently proximate the customer 102, the customer 102 may simply visit an office of the provider 118 so that the transaction takes place in person. Such in-person transactions may by especially suitable for payments by cash, check, or money order, but may also be convenient for payments by credit card or other instrument. In some instances, payment may instead be made to the provider 118 by mailing a check, money order, etc. or through any other payment system that transfers funds from the customer 102 to the provider 118.

Typically, the total amount to be paid by the customer 102 to the provider 118 is equal to the total cost of the goods due the merchant 106 plus a service charge. As used herein, the term "service charge" is intended to be broadly inclusive of a variety of appropriate charges that may be passed onto the customer 102. Such a service change may include, for example, a cost recovered by the provider 118 for the use of its services as an intermediary. In addition, such a service charge may include costs inherent in transporting the goods from the merchant 106, including shipping charges and insurance costs.

In certain embodiments, the existence of the provider 118 as an intermediary is exploited to achieve lower shipping charges and thereby make the products of the merchants 106 who use the service more attractive to customers 102. This feature by itself will also act as a further inducement for individual merchants 106 to participate in the system. Generally, relative shipping costs are lower for shipments of higher volumes of goods. Since a number of merchants 106 who use the system may be geographically proximate, it is possible for their individual shipments to be combined when sent to the provider 118 and thereby achieve lower shipping charges for each merchant 106. Such a feature is particularly attractive to smaller-volume merchants since they may then take advantage of incentives otherwise available only to larger-volume merchants. In one embodiment, the provider 118 performs the aggregation of orders itself and in another embodiment, the provider 118 simply acts to coordinate the aggregation with the actual aggregation of orders being carried out by a suitable shipping entity.

FIG. 3 shows that in some embodiments, the amount paid at block 308 is equal to this total amount to be paid to the provider 118 ("100%") and in other embodiments the amount paid at block 308 is a fraction of that total amount ("Fraction"). Typically, the fractional amount paid will be 10–50% of the total due, but other fractional amounts may also be paid. In embodiments where the customer 102 has paid in full, shown generally on the left side of FIG. 3, there are at least three possibilities contemplated: (1) the merchant 106 delivers the goods directly to the customer 102 at block 312; (2) the merchant 106 delivers the goods to the provider 118 at block 324; or (3) the merchant 106 fails to deliver the goods to either party at block 332. If the merchant 106 delivers the goods to the customer 102 at block 312, the provider 108 is subsequently notified of the delivery. Since at this stage in the transaction the customer 102 has paid for the goods and they have been delivered to the customer 102, the provider 118 pays the merchant 106 for the cost of the goods at block 320. The provider 118 retains the service charge that was included with the amount paid by the customer 102 at block 308.

Payment from the provider 118 to the merchant 106 as made at block 320 and at other blocks within the embodiments illustrated in FIG. 3 may proceed in a variety of ways. For example, the merchant 106 may receive payment directly from the provider 118 in cash or with a financial instrument, such as a check. In such instances, the provider 118 may send the cash or instrument to the provider 118 or to a financial institution, such as a bank, that represents the merchant 106. Alternatively, the provider 118 may collect the cash or instrument from an office affiliated with the provider 118 and proximate the merchant 106. In another embodiment, payment may be made from the provider 118 to the merchant 106 electronically; in cases where the methods of the invention are managed by software, the software may authorize the payment on satisfaction of certain conditions and automatically effect the electronic transfer of funds. Such electronic transfer may be to any account held by the merchant 106 that accepts electronic fund transfers.

In embodiments where the customer 102 and merchant 106 are located in separate countries, the funds to be received by the merchant 106 may be in a different currency than the funds paid by the customer 102. In such embodiments, the provider 118 may calculate appropriate currency exchanges and act as an exchange agent for the parties.

If instead the merchant 106 delivers the goods to the provider 324 at block 324, both the goods and the payment are in the possession of the provider 324. Accordingly, at block 328 the provider 118 pays the merchant 106, retaining the service charge that was included with the amount paid by the customer 102 at block 308. The customer 102 may then either be permitted to collect the goods from the provider 118 at block 329 or receive delivery of the goods from the provider at block 330. These separate embodiments may be more useful depending on the locations and preferences of the merchant 106. For example, the merchant 106 may be willing to deliver the goods to an office affiliated with the provider 118 that is proximate the customer 102, making it easy for the customer 102 to collect the goods from that office at block 329. In some instances, though, the merchant 106 may instead wish to deliver the goods to an office affiliated with the provider 118 that is proximate the merchant 106, making it preferable for the goods to be delivered by the provider 118 at block 330.

If the merchant fails to deliver the goods, as noted at block 332, the provider 118 refunds the customer 102 at block 336. Since the customer 102 has received no goods through no fault, such a refund will generally be of the entire amount paid by the customer 102 at block 308. The provider 118 may seek recovery of it service charge from the merchant 106 and the failure of the merchant 106 to provide the goods in accordance with the order will be a factor in evaluating the continued relationship between the provider 118 and the merchant 106.

In embodiments where the customer 102 pays only a fraction of total cost due, illustrated generally on the right side of FIG. 3, the merchant 106 either delivers the goods at block 340 or fails to deliver them at block 364. If the merchant 106 fails to deliver the goods, indicated at block 364, the provider 118 refunds the customer 102 at block 368. In this instance, the refund will typically be of the full amount paid by the customer 102, with the provider 118 left to seek recovery from the merchant 106 for its failure.

If the merchant 106 deliver the goods, it will generally be to the provider 118 as indicated at block 340. Delivery to the customer 102 at this point is generally undesirable since the customer 102 has not yet paid fully for the goods but may be acceptable in certain alternative embodiments. As a result, the provider 118 takes on the role of escrow agent at block 340 since it will hold the goods pending completion of payment by the customer 102. If the customer 102 pays the remainder due to cover the cost of the goods plus the service fee at block 344, effectively meeting the escrow-satisfaction conditions, the provider 118 releases the goods so that they may either be collected by the customer 102 at block 348 or delivered to the customer 102 by the provider 118 at block 346. Whether the customer 102 collects the goods or the provider 118 delivers the goods may depend on whether the office to which they were delivered by the merchant 106 at block 340 was proximate the merchant 106 or proximate the customer 102.

If the customer 102 fails to pay the remainder that is due, indicated at block 352, the partial payment that has been made may be used as a nonrefundable deposit on the goods. The provider 118 thus retains a portion of that partial payment as a service charge and pays a portion of it to the merchant 106 at block 356. The provider 118 will generally then follow instructions from the merchant 106 regarding the disposition of the goods—they may be held under a similar arrangement for another nearby purchaser or may be returned to the merchant 106 depending on the character of the goods and the specific circumstances.

The embodiments illustrated by FIG. 3 may be further embodied by software resident on the provider computer 120. Such software is configured to respond to data received initially indicating that the customer 102 has ordered goods from the merchant 106. Such data may be received directly from the internet 100 when the order is made or may be input through an input device 208 if the order is communicated to the provider 118 in a different fashion. Relevant data for the remainder of the methods shown in FIG. 3 may similarly be received by internet communications or entered through an input device 208 where the information is not available via the internet. Such information includes: when the merchant 106 delivers the goods, either to the customer 102 or to the provider 118; when the provider 118 is notified if delivery has been made directly to the customer 106; the date and amount of money paid to the provider 118 by the customer 102; when the customer 102 collects goods from the provider 118; the date and amount of funds paid by the provider 118 to the merchant; and any instruction for the disposition of goods provided by the merchant 106.

In addition, a storage device 216 within the provider computer 120 keeps track of such information and how it varies among different customers 102 and merchants 106 as payments are made and goods are transferred, to execute the methods illustrated in FIG. 3. The software functions generally as management software to oversee execution of the method. Thus, the software acts to authorize certain actions that may be taken by the provider 118 or one of its affiliated offices upon satisfaction of certain conditions. For example, when the conditions have been met within one of the particular embodiments shown in FIG. 3 for the provider 118 to pay the merchant 106, that action may be authorized by the software; in some embodiments where the software includes more functionality, it may also automatically make the payment electronically. Similarly, when conditions have been satisfied for the customer 102 to collect the goods or for the provider 108 to deliver the goods to the customer 102, those actions may be authorized by the software.

The storage device 216 will generally also store data that may be used in calculating service charges. For example, the amount to be collected by the provider 118 for its role as an intermediary in the transaction may depend on the size of the transaction and the locations of the customer 102 and merchant 106. The software may be configured to calculate this cost from the relevant data. Such factors may also affect shipping costs and insurance costs, which may thus also be calculated by the software. If the goods are to be shipped directly to the customer 102, the software may also be configured to provide shipping options to the merchant 106. Such shipping options may include, for example, overnight shipping, slow-boat shipping, air delivery, etc. In addition, the software may be configured to monitor currency exchange rates and to calculate cost conversions for the merchant 106 and/or customer 102 in those instances where the merchant 106 and customer 102 are located in different countries.

In those embodiments where the provider 118 acts to aggregate orders, or acts to coordinate such aggregation, the storage device 216 will store data dynamically as individual orders are placed. Such orders will then be organized according to geographical location of the involved merchants and ultimate destinations so that shipments may be made of aggregated orders. The size of the relevant geographical locations used in such aggregation may depend generally on the usual volume of orders between such locations.

Consider, for example, an embodiment in which the provider 118 has several affiliated offices in France, Germany, and the United States. In this example, a variety of merchants 106 in France and Germany participate in the system to satisfy goods orders from U.S. customers 102, with the volume being heavy in France and moderate in Germany. As orders are placed for goods with the German merchants, some of which are to be delivered to U.S. customers and some of which will be collected by U.S. customers at affiliated offices in the U.S., the software records the various shipment requirements. On some regular basis, such as daily, as goods are received by the affiliated German offices, they are then shipped aggregately to a central affiliated U.S. office, from which they are then distributed domestically within the U.S. to other affiliated offices or to customers as required. As orders are placed for goods with the French merchants, the software may accommodate the higher volume by additionally sorting according to destination. In that case, multiple aggregate shipments may be made to affiliated offices in different regions of the United States, say central, northeast, southeast, northwest, and southwest, from which the domestic distribution then takes place.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for managing a noncredit transaction for a sale of goods between a customer located in a first country and an Internet merchant having the goods in a second country, the method comprising:

receiving, by a provider computer operated by a provider affiliated with a plurality of geographically distributed provider offices, from the Internet merchant over a communications link between the Internet merchant and the provider computer, a communication relating to the transaction that includes a cost for the goods;

determining, by the provider computer, a shipment of the goods from the second country to the first country as part of an aggregate shipment, wherein the aggregate shipment contains goods associated with a plurality of sales of goods;

recording, by the provider computer over a communications link between the provider computer and an input device at one of the plurality of provider offices, confirmation of noncredit collection of the cost from the customer at the one of the plurality of provider offices in accordance with the communication;

authorizing payment, by the provider computer, of the cost to the Internet merchant from the provider after receipt over the communications link between the Internet merchant and the provider computer of confirmation that the Internet merchant has initiated shipment of the goods directly to the customer.

2. The method recited in claim 1 wherein recording confirmation of collection of the cost from the customer comprises recording confirmation of noncredit collection of an entirety of the cost plus a service charge before the merchant has initiated shipment of the goods.

3. The method recited in claim 1 wherein recording confirmation of collection of the cost from the customer comprises:

recording confirmation of collection of a portion of the cost plus a service charge before the merchant delivers the goods; and recording confirmation of collection of a remainder of the cost plus the service change after the merchant has initiated shipment of the goods.

4. The method recited in claim 1 wherein the customer and the Internet merchant are located in different countries.

5. The method recited in claim 1 wherein the communications link between the Internet merchant and the provider computer comprises an internet communications link.

6. The method recited in claim 1 further comprising providing, by the provider computer, a hyperlink to a web site of the Internet merchant.

7. A computer-readable storage medium having a computer-readable program embodied therein for directing operation of a computer system for a provider, the provider being affiliated with a plurality of geographically distributed offices and the computer system including a communications system, a processor, and a storage device, wherein the computer-readable program includes instructions for operating the computer system to manage a noncredit transaction for a sale of goods between a customer located in a first country and an Internet merchant having the goods in a second country in accordance with the following:

receiving a communication with the communications system over a communications link between the Internet merchant and the computer system, the communication relating to the transaction and including a cost for the goods;

determining, with the processor, a shipment of the goods from the second country to the first country as part of an aggregate shipment, wherein the aggregate shipment contains goods associated with a plurality of sales of goods;

recording on the storage device receipt of confirmation over a communications link between the computer system and an input device at one of the plurality of provider offices that the cost has been collected from a noncredit source of the customer at the one of the plurality of provider offices in accordance with the communication;

receiving confirmation over the communications link between the Internet merchant and the computer system that the Internet merchant has initiated shipment of the goods directly to the customer; and authorizing payment of the cost to the Internet merchant by the provider with the processor.

8. The computer-readable storage medium recited in claim 7 wherein the communications link between the Internet merchant and the computer system comprises an internet connection and the communication is received over the internet.

9. The computer-readable storage medium recited in claim 7 wherein the computer-readable program further includes instructions for operating the computer system for providing a hyperlink to a web site of the merchant.

10. The computer-readable storage medium recited in claim 7 wherein recording on the storage device confirmation that the cost has been collected from the customer in accordance with the communication comprises:

indicating that a portion of the cost plus a service change has been collected from a noncredit source before the merchant has initiated shipment of the goods; and indicating that a remainder of the cost plus a service charge has been collected from a noncredit source after the merchant has initiated shipment of the goods.

11. The computer-readable storage medium recited in claim 7 wherein recording on the storage device confirmation that the cost has been collected from the customer in accordance with the communication comprises indicating that an entirety of the cost plus a service charge has been collected from a noncredit source before the merchant initiates shipment of the goods.

12. The computer-readable storage medium recited in claim 7 wherein the computer-readable program further includes instructions for operating the computer system for calculating a service charge to be charged to the customer.

13. The computer-readable storage medium recited in claim 12 wherein the service charge includes shipping and insurance costs for delivering the goods.

14. The computer-readable storage medium recited in claim 7 wherein the computer-readable program further includes instruction for performing a currency exchange of the cost.

15. A computer system comprising:
a communications system;
a storage device;
a processor in communication with the communications system and the storage device; and
a memory coupled with the processor, the memory comprising a computer-readable storage medium having a computer-readable program embodied therein for directing operation of the computer system for a provider affiliated with a plurality of geographically distributed offices to manage a noncredit transaction for a sale of goods between a customer located in a first country and an Internet merchant having the goods in a second country, the computer-readable program including:

instructions for receiving a communication with the communications system over a communications link between the Internet merchant and the computer system, the communication relating to the transaction and including a cost for the goods;

instructions for determining a shipment of the goods from the second country to the first country as part of an aggregate shipment, wherein the aggregate shipment contains goods associated with a plurality of sales of goods;

instructions for recording on the storage device receipt of confirmation over a communications link between the computer system and an input device at one of the plurality of provider offices that the cost has been collected from a noncredit source of the customer at the one of the plurality of provider offices in accordance with the communication;

instructions for receiving confirmation over the communications link between the Internet merchant and the computer system that the Internet merchant has initiated shipment of the goods directly to the customer; and instructions for authorizing payment of the cost to the Internet merchant by the provider with the processor.

16. The computer system recited in claim 15 wherein the communications link between the Internet merchant and the computer system comprises an internet connection and the instructions for receiving the communication comprise instructions for receiving the communication from the internet.

* * * * *